(12) United States Patent
Maryfield

(10) Patent No.: US 8,027,591 B2
(45) Date of Patent: Sep. 27, 2011

(54) RESONANT QUANTUM WELL MODULATOR DRIVER

(75) Inventor: Tony Maryfield, Poway, CA (US)

(73) Assignee: Cubic Corporation, San Diego, CA (US)

( * ) Notice: Subject to any disclaimer, the term of this patent is extended or adjusted under 35 U.S.C. 154(b) by 528 days.

(21) Appl. No.: 12/260,935

(22) Filed: Oct. 29, 2008

(65) Prior Publication Data

US 2009/0116850 A1 May 7, 2009

Related U.S. Application Data

(60) Provisional application No. 60/983,516, filed on Oct. 29, 2007.

(51) Int. Cl.
*H04B 10/00* (2006.01)
(52) U.S. Cl. .......... 398/170; 398/38; 398/107; 398/108; 398/130
(58) Field of Classification Search ............... 398/9, 25, 398/33, 38, 107, 108, 118, 119, 120, 130, 398/168–170
See application file for complete search history.

(56) References Cited

U.S. PATENT DOCUMENTS

| | | | |
|---|---|---|---|
| 3,710,122 A | 1/1973 | Burcher et al. | |
| 4,097,141 A | 6/1978 | Warner | |
| 4,143,263 A | 3/1979 | Eichweber | |
| 4,673,299 A | 6/1987 | Dakin | |
| 4,716,449 A | 12/1987 | Miller | |
| 4,777,660 A | 10/1988 | Gould et al. | |
| 4,837,575 A | 6/1989 | Conner, Jr. | |
| 4,866,781 A | 9/1989 | Borken et al. | |
| 4,937,795 A | 6/1990 | Motegi et al. | |
| 4,983,021 A | 1/1991 | Fergason | |
| 5,015,096 A | 5/1991 | Kowalski et al. | |
| 5,083,866 A | 1/1992 | Dey | |
| 5,084,628 A | 1/1992 | Burge et al. | |
| 5,117,305 A | 5/1992 | Dey | |
| 5,121,242 A | 6/1992 | Kennedy | |

(Continued)

FOREIGN PATENT DOCUMENTS

EP  1536401 A  6/2005

(Continued)

OTHER PUBLICATIONS

U.S. Appl. No. 11/140,473, filed May 27, 2005, Varshneya, et al.

(Continued)

*Primary Examiner* — Li Liu
(74) *Attorney, Agent, or Firm* — Kilpatrick Townsend & Stockton LLP

(57) ABSTRACT

A drive circuit and method of controlling a quantum well modulator are disclosed. The drive circuit can be disposed in an optical transceiver having a quantum well modulator configured to retro-modulate an incoming optical signal. The drive circuit can include separate modulating and bias voltage sources. A level of the modulating voltage and the bias voltage can be determined based on an ambient temperature of the optical transceiver and can be adjusted to compensate for variations in the optical performance of the quantum well modulator. The quantum well modulator can be controlled in intervals. The modulating voltage can be applied to the quantum well modulator during a first interval. A current associated with the modulating voltage can be returned to the modulation voltage source during a second interval. A timing of the first and second intervals can be based on electrical properties of the quantum well modulator.

24 Claims, 6 Drawing Sheets

U.S. PATENT DOCUMENTS

| | | | |
|---|---|---|---|
| 5,136,602 A | 8/1992 | Sugawara | |
| 5,144,397 A | 9/1992 | Tokuda et al. | |
| 5,173,643 A | 12/1992 | Sullivan et al. | |
| 5,274,379 A | 12/1993 | Carbonneau et al. | |
| 5,299,227 A | 3/1994 | Rose | |
| 5,306,925 A | 4/1994 | Abe et al. | |
| 5,394,489 A | 2/1995 | Koch | |
| 5,426,295 A | 6/1995 | Parikh et al. | |
| 5,448,045 A | 9/1995 | Clark | |
| 5,448,847 A | 9/1995 | Teetzel | |
| 5,459,470 A | 10/1995 | Wootton et al. | |
| 5,476,385 A | 12/1995 | Parikh et al. | |
| 5,539,565 A | 7/1996 | Waddoups et al. | |
| 5,589,981 A | 12/1996 | Kasser et al. | |
| 5,615,037 A | 3/1997 | Betts et al. | |
| 5,648,862 A | 7/1997 | Owen | |
| 5,668,386 A | 9/1997 | Makiuchi et al. | |
| 5,686,722 A | 11/1997 | Dubois et al. | |
| 5,815,295 A | 9/1998 | Darcie et al. | |
| 5,819,164 A | 10/1998 | Sun et al. | |
| 5,822,430 A | 10/1998 | Doud | |
| 5,870,215 A | 2/1999 | Milano et al. | |
| 5,912,475 A | 6/1999 | Itagaki et al. | |
| 5,966,226 A | 10/1999 | Gerber | |
| 5,966,227 A | 10/1999 | Dubois et al. | |
| 5,974,209 A * | 10/1999 | Cho et al. | 385/28 |
| 6,005,276 A | 12/1999 | Forrest et al. | |
| 6,016,212 A | 1/2000 | Durant et al. | |
| 6,055,087 A | 4/2000 | Kwon et al. | |
| 6,097,330 A | 8/2000 | Kiser | |
| 6,154,299 A * | 11/2000 | Gilbreath et al. | 398/170 |
| 6,229,165 B1 | 5/2001 | Sakai et al. | |
| 6,278,136 B1 | 8/2001 | Nitta | |
| 6,403,949 B1 | 6/2002 | Davis et al. | |
| 6,438,150 B1 | 8/2002 | Yoo | |
| 6,450,816 B1 | 9/2002 | Gerber | |
| 6,493,123 B1 | 12/2002 | Mansell et al. | |
| 6,518,572 B1 | 2/2003 | Kishii et al. | |
| 6,525,826 B2 | 2/2003 | De Groot et al. | |
| 6,545,805 B2 | 4/2003 | He et al. | |
| 6,559,987 B2 | 5/2003 | Liu | |
| 6,646,292 B2 | 11/2003 | Steigerwald et al. | |
| 6,661,974 B1 | 12/2003 | Akiyama et al. | |
| 6,687,268 B2 | 2/2004 | Kitamura et al. | |
| 6,736,518 B1 | 5/2004 | Belt et al. | |
| 6,803,604 B2 | 10/2004 | Takahashi et al. | |
| 6,836,351 B2 | 12/2004 | Livingston et al. | |
| 6,845,184 B1 | 1/2005 | Yoshimura et al. | |
| 7,213,942 B2 | 5/2007 | Jiang et al. | |
| 7,308,202 B2 | 12/2007 | Roes et al. | |
| 7,308,207 B2 | 12/2007 | Chen | |
| 7,327,957 B2 | 2/2008 | Lee et al. | |
| 7,333,735 B1 | 2/2008 | Goorjian | |
| 7,388,654 B2 | 6/2008 | Raab et al. | |
| 7,522,648 B2 | 4/2009 | Park et al. | |
| 7,602,485 B2 | 10/2009 | Mori | |
| 7,603,041 B2 | 10/2009 | Varshneya et al. | |
| 7,679,805 B2 | 3/2010 | Dadkhah et al. | |
| 7,715,727 B2 * | 5/2010 | Murphy et al. | 398/170 |
| 7,760,782 B2 | 7/2010 | Aoki | |
| 2001/0013967 A1 | 8/2001 | Tsumura | |
| 2001/0035723 A1 | 11/2001 | Pelrine et al. | |
| 2001/0035995 A1 | 11/2001 | Ruggiero | |
| 2002/0021462 A1 | 2/2002 | Delfyett et al. | |
| 2002/0063927 A1 | 5/2002 | Ofek et al. | |
| 2002/0181080 A1 | 12/2002 | Lim | |
| 2003/0012244 A1 | 1/2003 | Krasulick et al. | |
| 2003/0048533 A1 | 3/2003 | Lyons, III | |
| 2003/0147651 A1 | 8/2003 | Roes et al. | |
| 2003/0227681 A1 | 12/2003 | Currie | |
| 2004/0027634 A1 | 2/2004 | Bond et al. | |
| 2004/0075880 A1 | 4/2004 | Pepper et al. | |
| 2004/0179855 A1 | 9/2004 | Harada | |
| 2005/0018720 A1 | 1/2005 | Kish et al. | |
| 2005/0158059 A1 | 7/2005 | Vaananen | |
| 2006/0002438 A1 | 1/2006 | Brown | |
| 2006/0054899 A1 | 3/2006 | Takahashi et al. | |
| 2006/0060651 A1 | 3/2006 | McIntyre et al. | |
| 2006/0180830 A1 * | 8/2006 | Alavi et al. | 257/184 |
| 2006/0215147 A1 | 9/2006 | Scott et al. | |
| 2006/0222375 A1 | 10/2006 | Raddatz | |
| 2006/0239609 A1 | 10/2006 | Sorin et al. | |
| 2006/0280505 A1 * | 12/2006 | Varshneya et al. | 398/140 |
| 2007/0127928 A1 | 6/2007 | Varshneya et al. | |
| 2007/0177880 A1 | 8/2007 | Karasikov et al. | |
| 2008/0138088 A1 | 6/2008 | Welch et al. | |
| 2008/0217602 A1 | 9/2008 | Kahen | |
| 2009/0010644 A1 * | 1/2009 | Varshneya et al. | 398/33 |

FOREIGN PATENT DOCUMENTS

| | | |
|---|---|---|
| GB | 2366872 A | 3/2002 |
| JP | 4263475 A | 9/1992 |
| JP | 2000/299489 A | 10/2000 |
| WO | WO 99/57789 A | 11/1999 |
| WO | WO 03075493 A | 9/2003 |

OTHER PUBLICATIONS

U.S. Appl. No. 12/171,803, filed Jul. 11, 2008, Dadkhah, et al.
U.S. Appl. No. 12/171,837, filed Jul. 11, 2008, Dadkhah, et al.
PCT International Search Report mailed Dec. 30, 2009; International Application No. PCT/US2008/081618; 5 pages.
Office Action dated May 29, 2009 in U.S. Appl. No. 12/171,803, 8 pages.
U.S. Appl. No. 11/295,849, filed Dec. 7, 2005, Varshneya et al.
Hong, Y.K., et al. "Corner Cube Reflectors by Surface Tension Self-Assembly", Imperial College London; UC Berkeley, [undated], 2 pgs.
Hong, Y.K., et al. Design, fabrication and test of self-assembled optical corner cube reflector', *J. Micromech. Microeng.* (2005) 15:663-672.
Office Action dated Dec. 16, 2005 in U.S. Appl. No. 11/140,473, 6 pgs.
Office Action dated Dec. 29, 2008 in U.S. Appl. No. 11/295,849, 13 pgs.
Office Action dated Apr. 16, 2008 in U.S. Appl. No. 11/295,849, 12 pgs.
Office Action dated Jul. 1, 2009 in U.S. Appl. No. 11/295,849, 10 pgs.
Office Action dated May 29, 2009 in U.S. Appl. No. 12/171,803, 8 pgs.
PCT International Search Report and Written Opinion mailed Feb. 13, 2009; International Application No. PCT/US2008/069875, 21 pages.
PCT International Search Report and Written Opinion mailed Nov. 13, 2008, Application No. PCT/US2008/069888, 14 pages.
PCT International Search Report and Written Opinion mailed Oct. 10, 2008, Application No. PCT/US2008/069874, 15 pages.
Rabinovich, .W.S., et al. "Cat's eye modulating retro-reflectors for free-space optical data transfer", [undated], 10 pgs.
Rabinovich, .W.S., et al. Free-Space Optical Link with Low Alignment Sensitivity using the 1553 Protocol, [undated], 8 pgs.
Rabinovich, .W.S., et al. "InGaAs Multiple Quantum Well Modulating Retro-reflector for Free Space Optical Communications", US Naval Research Laboratory, Washington, D.C. 20375 [undated], 12 pgs.
Rarity, J.G., et al. "Ground to satellite secure key exchange using quantum cryptography", *New Journal of Physics* (2002) 4:82.1-82. 21.

* cited by examiner

RESONANT QUANTUM WELL MODULATOR DRIVER

CROSS-REFERENCES TO RELATED APPLICATIONS

This application claims the benefit of and is a non-provisional of U.S. Provisional Application 60/983,516 filed on Oct. 29, 2007, which is assigned to the assignee hereof and incorporated herein by reference for all purposes.

BACKGROUND

The present invention relates to optical communications and, more specifically, to a retro-modulating optical transceiver.

In combat identification systems, an optical transceiver can employ modulators and/or reflectors to respond to an interrogating beam of light. The modulators control the incoming beam and the reflectors direct it back toward the source. Modulating retro-reflectors, in general, are becoming smaller, lighter, and faster. Also, modulating retro-reflectors are becoming increasingly portable and their use on the battlefield and in combat training is growing.

BRIEF SUMMARY

Techniques for controlling the operation of a quantum well modulator are disclosed. In one embodiment, a drive circuit is disclosed. The drive circuit includes a bias voltage source coupled to the quantum well modulator for supplying a bias voltage to the quantum well modulator. A modulation voltage source is also coupled to the quantum well modulator for supplying a modulating voltage. The bias voltage and the modulating voltage operate to control the optical properties of the quantum well modulator. A first switch is coupled to the modulation voltage source and to the quantum well modulator. Based on its state, the first switch delivers the modulating voltage to the quantum well modulator via a first conduction path. A second switch is coupled to the first switch and to the quantum well modulator. The second switch returns a current associated with the modulating voltage to the modulation voltage source via a second conduction path according to it state. A processor varies the state of the first switch and the second switch such that the modulating voltage is alternately supplied from the modulation voltage source and the current is returned to the modulation voltage source. Optionally, the processor adjusts a level of the modulating voltage and the bias voltage based on an ambient temperature of the drive circuit.

In another embodiment, an communication device is disclosed. The communication device includes a modulator, a retro-reflector, and a processor. The modulator includes a quantum well modulator which modulates an incoming optical signal in response to a modulation voltage. A first switch of the modulator selectively delivers the modulating voltage from a power supply to the quantum well modulator based on a first control signal. A second switch of the modulator selectively returns a current associated with the modulating voltage to the power supply based on a second control signal. The processor generates a timing of the first and second control signals such that pulses of the modulation voltage are delivered to the quantum well modulator during a first interval and current is returned to the power supply during a second interval. The retro reflector is coupled to the quantum well modulator and reflects the modulated optical signal away from the communication device.

In one embodiment, a drive circuit is disclosed. The drive circuit is coupled to a first voltage source and a second voltage source. The first voltage source establishes a bias level of the quantum well modulator. The second voltage source supplies a modulating voltage to the quantum well modulator for changing its optical properties when the quantum well modulator is biased by the first voltage source. A temperature detector detects an ambient temperature of the drive circuit. A processor coupled to the temperature detector controls delivery of the modulating voltage in response to an incoming optical signal and dynamically adjusts a voltage level of the first voltage source and the second voltage source based on the ambient temperature.

In one embodiment, a method of controlling a quantum well modulator is disclosed. The method includes detecting an ambient temperature of the quantum well modulator, determining a bias voltage level based on the ambient temperature, and delivering the bias voltage to the quantum well modulator. The method includes determining a modulating voltage level based on the ambient temperature and delivering pulses of the modulating voltage to the quantum well modulator in response to an incoming optical signal. The method also includes determining a timing of the pulses based on electrical characteristics of the drive circuit and the quantum well modulator so as to minimize a power consumption of the drive circuit.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS

The ensuing description provides preferred exemplary embodiment(s) only, and is not intended to limit the scope or applicability of the disclosure. Rather, the ensuing description of preferred embodiment(s) will provide those skilled in the art with an enabling description for implementing the preferred exemplary embodiment. It is understood that various changes may be made in the function and arrangement of the elements without departing from the spirit and scope of the disclosure.

A drive circuit and method of controlling a quantum well modulator are disclosed. The drive circuit can be disposed in an optical transceiver having a quantum well modulator configured to retro-modulate an incoming optical signal. The drive circuit can include separate modulating and bias voltage sources. A level of the modulating voltage and the bias voltage can be determined based on an ambient temperature of the optical transceiver and can be adjusted to compensate for variations in the optical performance of the quantum well modulator. The quantum well modulator can be controlled in intervals. The modulating voltage can be applied to the quantum well modulator during a first interval. A current associated with the modulating voltage can be returned to the modulation voltage source during a second interval. A timing of the first and second intervals can be based on electrical properties of the quantum well modulator.

Figure 1:
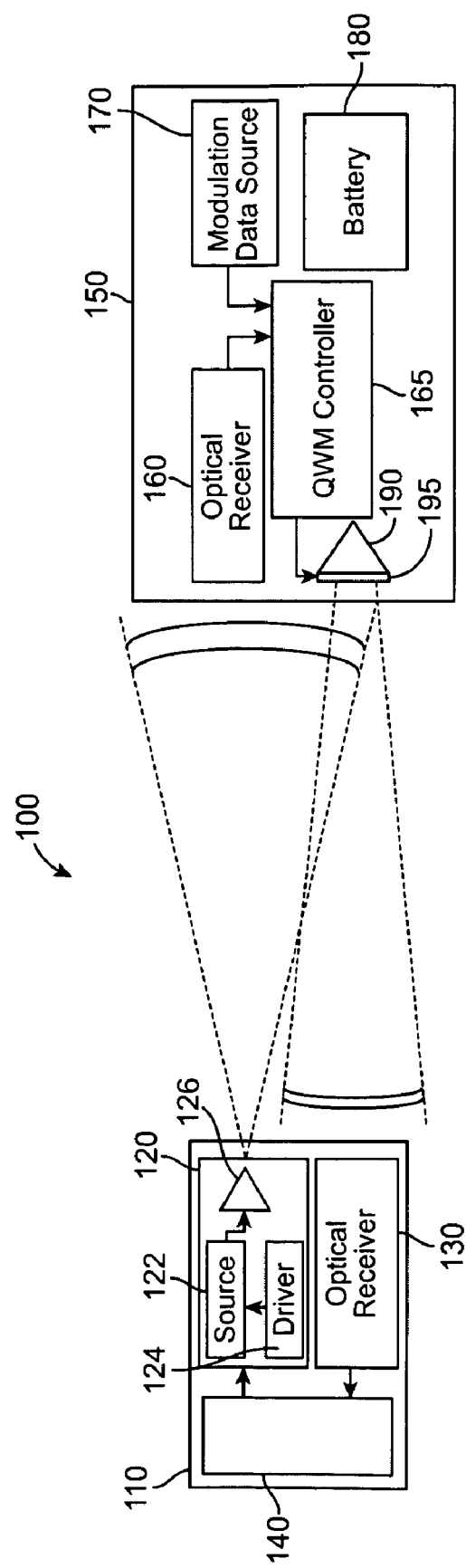
FIG. 1 is a functional block diagram of an optical communication system.

FIG. 1 is a functional block diagram of a free space optical system 100 according to one embodiment of the present invention. Optical communication system 100 can include a first transceiver 110 that is configured to generate a modulated optical signal. The modulated optical signal can be transmitted to a second transceiver 150, for example, via a free space communication channel. The second transceiver 150 can be configured to receive the modulated optical signal and to generate a return coded optical signal.

First transceiver 110 can include an optical transmitter 120 for generating an outgoing optical signal and an optical receiver 130 configured to receive a retro-modulated optical signal, or some other received optical signal. The optical transmitter 120 can include an optical source 122 such as a laser. The output of optical source 122 can be controlled by a transmit driver 124 which can, for example, modulate the optical signal by modulating the laser drive current.

In some embodiments, transmit driver 124 can be configured to pulse the current to the optical source 122 to create a pulsed optical output signal. Transmit driver 124 can control the timing and duration of the pulses according to a data source, such as a data and control module 140. The optical signal can be coupled from optical source 122 to an optical amplifier 126 which can be configured to amplify the modulated optical signal before coupling it to the communication channel.

Second transceiver 150 can be configured to receive the modulated optical signal over the communication channel. As shown in FIG. 1, second transceiver 150 includes an optical receiver 160 and a quantum well modulator controller 165 (also referred to herein as "QWM controller" or "controller"). Optical receiver 160 can be configured to receive the modulated optical signal from the communication channel and to recover the modulation data.

Controller 165 can determine, for example, if at least a portion of the modulation data corresponds to a predetermined signal or sequence. If it is determined that the modulation data recovered from the incoming optical signal corresponds to the predetermined signal or sequence, controller 165 can control retro-modulation of the incoming optical signal by quantum well modulator 195 and retro-reflector 190. For example, by adjusting a voltage applied to quantum well modulator 195, an on-off keying of the incoming optical signal can be performed.

Second transceiver 150 can also include a modulation data source 170. When the predetermined signal or sequence is detected, controller 165 can drive quantum well modulator 195 with a modulation voltage as determined by modulation data source 170. Quantum well modulator 195 can be positioned on the front surface of retro-reflector 190 to retro-modulate the incident optical signal. Based on the modulation voltage, quantum well modulator 195 can re-modulate the incoming optical signal. Retro-reflector 190 can reflect the incoming optical signal away from second transceiver 150 along the direction of the incident optical signal. In this manner, the second transceiver 150 is not required to include an optical signal source.

The electronics of second transceiver 150 can be powered by a battery 180. For example, second transceiver 150 can be embodied in an optical tag such an used with a combat identification (CID) system. In CID systems, optical tags are portable devices which can be carried or worn on a garment and retro-reflect optical signals as a means of communication. Optical tags, for example, can detect a challenge code as part of an incoming optical signal and retro-modulate the incoming signal with an appropriate response code. In this way, a person or object can be identified as friendly (or unknown) in a battlefield environment or as part of a combat training exercise.

QWM controller 165 can include a high-efficiency drive circuit for controlling quantum well modulator 195. The drive circuit can be configured to deliver a modulating voltage to quantum well modulator 195 from a power source of optical transceiver 150 and to return a current associated with the modulating voltage back to the power source. In one embodiment, controller 165 includes a processor which implements resonant switching of the modulating voltage so as to exploit electrical characteristics of quantum well modulator 195. In additional embodiments, controller 165 compensates for environmental conditions by detecting an ambient temperature of second transceiver 150 and dynamically adjusting voltage levels according to the optical performance characteristics of quantum well modulator 195.

Figure 2:
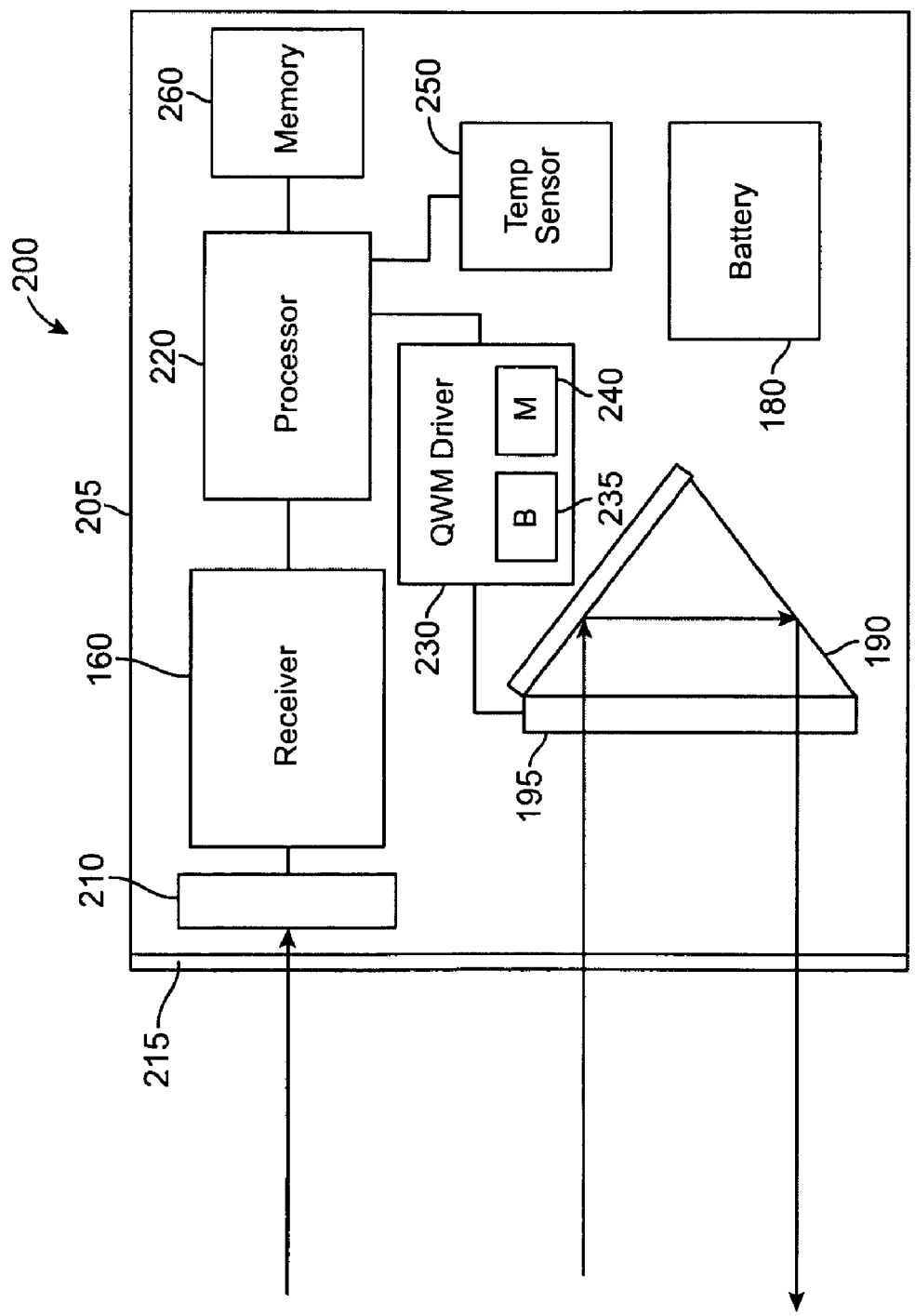
FIG. 2 is a block diagram of an optical communication transceiver.

FIG. 2 is a functional block diagram of a retro-modulating optical transceiver 200 according to one embodiment of the present invention. As shown, optical transceiver 200 includes a window 215 through which an incoming signal can pass into housing 205. In a combat identification system, for example, window 215 may pass portions of the infrared spectrum into housing 205. These signals can have wavelengths ranging from about 700 nm up to approximately 1 mm. In some embodiments, the incoming signals may have other wavelengths, including portions of the visible spectrum (380 nm-750 nm). For convenience, the incoming signals are referred to as "optical signals" regardless of whether they are visible to the human eye.

An incoming optical signal passing through window 215 can be coupled to a filter 210. As shown, filter 210 is coupled to optical receiver 160 and can limit its exposure to environmental radiation not used for communication. For example, filter 210 can be matched to the optical properties of receiver 160 to limit the effect of solar loading when optical transceiver 200 is used in daylight conditions. Optical receiver 160 can include a photodiode such as a silicon (Si), germanium (Gr), indium gallium arsenide (InGaAs), or like photo detector that is sensitive to wavelengths of the optical communication signal. Optical receiver 160 converts the incoming optical signal into an electrical signal.

The incoming optical signal can also pass through window 215 to quantum well modulator 195. Quantum well modulator 195 can perform optical switching based on electroabsorption. The electroabsorption effect operates on very small time scales, for example, on the order of picoseconds or less. When an electric field is applied across an active region of quantum well modulator 195, absorption for photon energies increases just below the band gap by the Stark effect. As the electric field is increased further, the band edge shifts to lower photon energies. By controlling a voltage applied to quantum well modulator 195 and therefore the electric field, its optical properties can be rapidly changed.

As shown, quantum well modulator 195 is coupled to a front surface of a retro-reflector 190. Retro-reflector 190 can be a corner-cube reflector (CCR) or like device configured to direct the incoming optical signal away from optical transceiver 200. Corner cube reflectors (CCRs) can be pyramids with three internal reflective surfaces and a front entrance base. The reflective surfaces can be joined with 90 degree angles at the apex of the pyramid. The base may have different shapes, for example a triangle, a square, a hexagon, a circle, and is referred to as a front surface. Under the control of QWM driver 230, quantum well modulator 195 and retro-reflector 190 can re-modulate the incoming optical signal. For example, optical transceiver 200 can perform a kind of on-off keying of the incoming optical signal such that it is re-modulated according to signals from QWM driver 230.

Processor 220 is coupled to an output of optical receiver 160 for receiving electrical signals representative of the incoming optical signal. Processor 220 can be a field programmable gate array (FPGA), microprocessor, microcontroller, application-specific integrated circuit (ASIC), or like processing device.

In a combat identification system, the optical signal can comprise a coded message having, for example, a transmit code of the day (TCOD). The coded message can be arranged with a frame-synchronization preamble, followed by the TCOD, and then by an interrogation pulse stream. Processor 220 can be configured to detect the TCOD portion of the coded message and verify that it is valid. When the TCOD has been verified, processor 220 can be configured to output control signals to QWM driver 230 with which to re-modulate one or more portions of the coded optical message. For example, when a valid TCOD is detected, processor 220 may cause the interrogation pulse stream to be re-modulated with an identification code or other data.

QWM driver 230 can be configured to deliver a modulating voltage to quantum well modulator 195 in response to signals from processor 220. As shown, QWM driver 230 includes bias voltage source 235 and modulation voltage source 240 both of which can be powered by battery 180. In other embodiments, bias voltage source 235 and modulation voltage source 240 can be separate from QWM driver 230 such that each is coupled to QWM driver 230 for supplying its respective voltage.

QWM driver 230 is a high-efficiency driver which extends the operating life of battery 180 while maintaining an optimal modulation depth of the retro-modulated signal. In one embodiment, QWM driver 230 controls delivery of the modulating voltage to quantum well modulator 195 such that current is sourced from and returned to modulation voltage source 240 with minimal loss. Also, a level of the bias voltage source 235 and the modulating voltage source 240 can be varied to compensate for changes in the optical properties of quantum well modulator 195 due to ambient temperature.

As shown, processor 220 is coupled to temperature sensor 250. In operation, temperature sensor 250 can generate a signal representative of the ambient temperature of optical transceiver 200. Processor 220 can separately control the output of bias voltage source 235 and modulation voltage source 240 based on the ambient temperature. In other words, processor 220 can be configured to compensate for variations in ambient temperature by adjusting a level of the bias voltage and the modulating voltage applied to quantum well modulator 195.

In some embodiments, processor 220 retrieves temperature compensation values from a memory 260 or other storage device. Memory 260 can include volatile and/or non-volatile elements for storing program instructions and data used by processor 220. In one embodiment, memory 260 includes a lookup table. The lookup table can include values of ambient temperature and associated bias voltage levels and modulating voltage levels considered to be optimum for re-modulating the incoming optical signal. An exemplary temperature table is provided below.

| Temp | Bias voltage (DC) | Modulating voltage (½ sine) |
|---|---|---|
| −40 C. | 85 V | 15 V |
| +20 C. | 50 V | 20 V |
| +70 C. | 20 V | 38 V |

As the exemplary table illustrates, bias voltage and modulating voltage vary based on ambient temperature. In some embodiments, modulating voltage can represent the amplitude of an alternating voltage waveform such as a ½ sinusoidal waveform. Bias voltage can be a DC value. It will be understood that these values are illustrative only and that other voltage levels and waveforms are specifically contemplated for use with the present invention. For example, bias and modulating voltage levels may be selected to achieve an optimum modulation depth based on a breakdown voltage or other characteristics of quantum well modulator 195.

Processor 220 can supply one or more control signals to QWM driver 230 for controlling the timing and delivery of the modulating voltage to quantum well modulator 195. Processor 220 can time delivery of the control signals to QWM modulator 230 in relation to the incoming optical signal. For example, if a valid TCOD is detected, processor 220 can time-align the control signals with a portion of the incoming optical signal such as the interrogation pulse stream. The control signals from processor 220 can also establish a duration and pulse rate at which the modulating voltage is supplied from modulation voltage source 240 to quantum well modulator 195.

In one embodiment, processor 220 and QWM driver 230 perform a controlled switching (also "resonant switching") of the modulating voltage based on electrical properties of the quantum well modulator 195. During a first switching cycle, for example, QWM driver 230 can make a connection between modulation voltage source 240 and quantum well modulator 195 such that the modulating voltage is applied to quantum well modulator 195. During a second switching cycle, QWM driver 230 can interrupt the connection and return current associated with the modulating voltage to the modulation voltage source 240. QWM driver 230 can include an inductor and the switching cycles can be determined based on a resonance between the inductor and a capacitance of quantum well modulator 195. By delivering current from and returning current to modulation voltage source 240, the power requirements of optical transceiver 200 can be reduced and the life of battery 180 can be extended.

Figure 3:
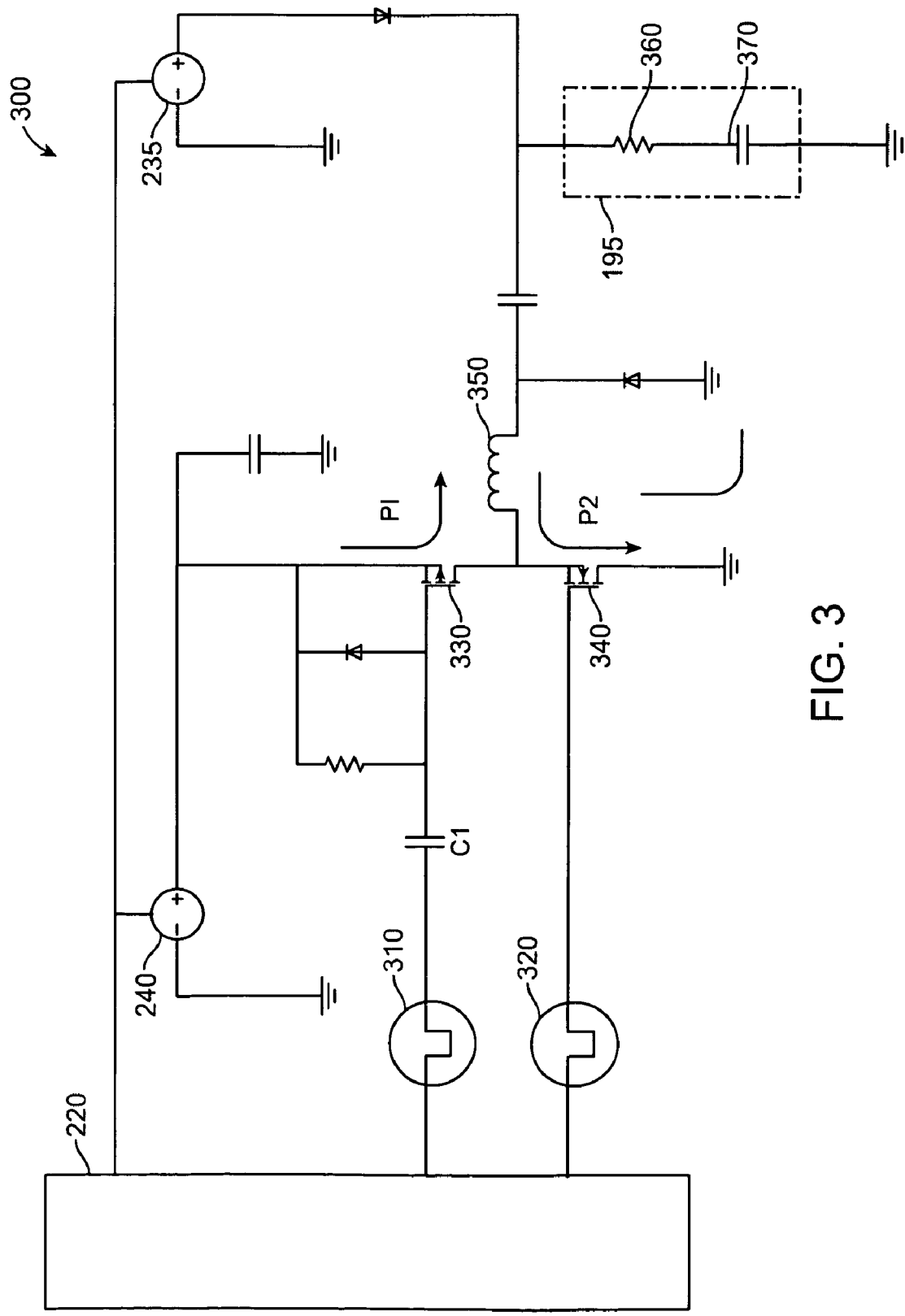
FIG. 3 is a schematic diagram of a drive circuit.

FIG. 3 shows portions of a quantum well modulator drive circuit 300 according to embodiments of the present invention. Drive circuit 300 can be used with QWM driver 230 and, more generally, as part of optical transceivers 150, 200. As shown, drive circuit 300 is configured to superimpose a voltage from modulation voltage source 240 and bias voltage source 235 upon quantum well modulator 195.

Processor 220 is coupled to modulation voltage source 240 and bias voltage source 235. Processor 220 can be configured to set a level of the bias and modulating voltages based on ambient temperature. For example, processor 220 may calculate a level of the bias and modulating voltages based on the ambient temperature or it may retrieve predetermined voltage values from memory 260.

By employing separate modulation and bias voltage sources, drive circuit 300 avoids losses and can extend the life of battery 180. For example, a full amplitude drive voltage for use with quantum well modulator can exceed 90V. Driving quantum well modulator 195 with a full amplitude voltage can result in losses from an excessive charge transfer. However, with drive circuit 300, losses associated with the bias voltage are due mainly to leakage currents and can be considered minimal. Also, as described below, drive circuit 300 can minimize losses due to the modulating voltage by delivering the modulating voltage and subsequently returning a current associated with the modulating voltage to modulation voltage source 240.

Processor 220 can be configured to generate upper drive signal 310 and lower drive signal 320. Drive signals 310, 320 can be pulses characterized by a duty cycle and repetition rate or they can be other types of signals. As shown, upper drive signal 310 is coupled to an upper switch 330 for controlling a modulating voltage from modulation voltage source 240. Upper switch 330 can be a p-channel transistor and upper drive signal 310 can be coupled to its gate terminal through capacitor C1. When upper switch 330 is conducting, the modulating voltage causes a current flow along a first conduction path P1.

Lower drive signal 320 can be coupled to a lower switch 340 for controlling a second conduction path P2. As shown, lower drive signal 320 is connected to the gate terminal of an n-channel transistor. When conducting, lower switch 340 allows a current to flow from inductor 350 back to the modulation voltage source 240. Thus, as shown, upper drive signal 330 controls delivery of the modulating voltage whereas lower drive signal 320 controls return of a current associated with the modulating voltage to modulation voltage source 240.

Persons of skill in the art will recognize that other switching arrangements are possible within the scope of the present invention. In particular, upper switch 330 and lower switch 340 are not limited to transistors or to specific types of transistors but can include other switching devices or circuits for controlling a current flow to and from quantum well modulator 195.

Figure 4:
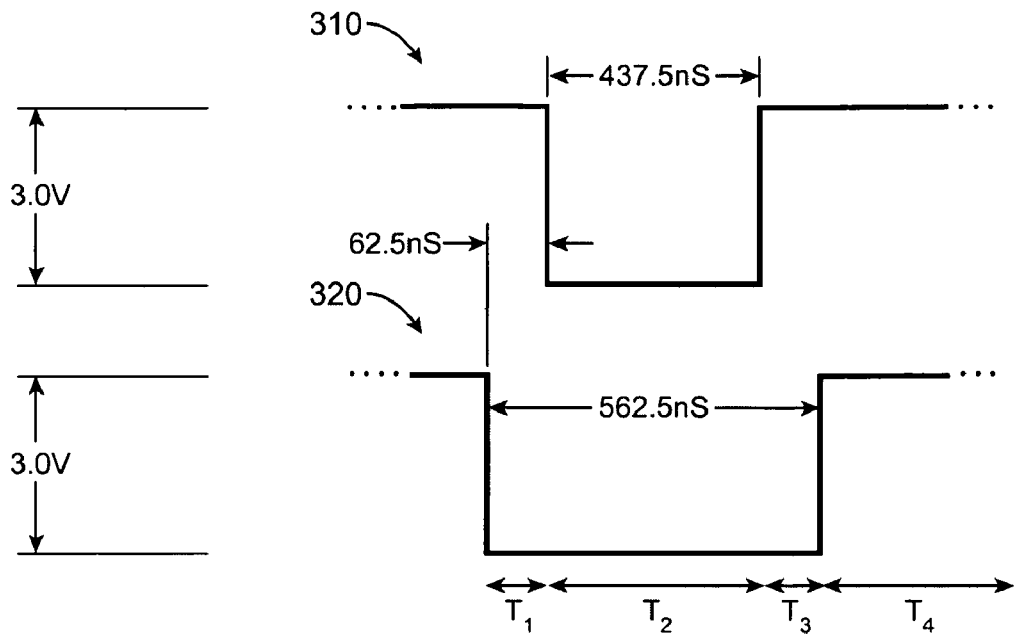
FIG. 4 illustrates exemplary drive signals which can be used with the drive circuit depicted in FIG. 3.

Processor 220 can be configured to generate upper and lower drive signals 310, 320 to perform a controlled switching of the modulating voltage. FIG. 4 shows a pair of exemplary drive signals such as can be generated by processor 220. For purposes of illustration, upper drive signal 310 and lower drive signal 320 are shown as square waves having a 3V amplitude such as can be used to interface with CMOS devices. Also, an exemplary 16 MHz clock rate is selected for defining clock cycles.

As shown, both upper drive signal 310 and lower drive signal 320 are initially in a logical high state. Lower drive signal 320 then transitions to a logical low state at the start of the interval labeled $T_1$. At that point, switches 330 and 340 can be in a non-conducting state representing the start of a switching cycle. Interval $T_1$ is shown as having a period of 62.5 ns or one exemplary clock cycle. At the beginning of interval $T_2$, upper drive signal 310 transitions to a logical low state. This can represent a time when upper switch 330 begins conducting and current flows along path P1 from modulation voltage source 240.

During interval $T_2$, the modulating voltage is applied to quantum well modulator 195. As shown, $T_2$ lasts for 437.5 ns (seven exemplary clock cycles) and is terminated when upper drive signal 310 transitions from the logical low state to a logical high state. Interval $T_3$ defines a dead time lasting for 62.5 ns after which lower drive signal 320 transitions from the logical low to the logical high state. Interval $T_4$ represents a return interval during which a current can flow along conduction path P2 back to the modulation voltage source 240. By controlling the timing of the drive signals, processor 220 causes the modulating voltage to be delivered to quantum well modulator 195 during a first interval and a current associated with the modulating voltage to be returned to the modulation voltage source during a second interval.

In some embodiments, the timing and duration of drive signals 310, 320 are based on electrical properties of quantum well modulator 195. As illustrated, quantum well modulator 195 can be represented by an equivalent series resistance 360 and a capacitance 370. A value of inductor 350 can be selected to create a resonance with the depleted capacitance of quantum well modulator 195. Processor 220 can be configured to generate the drive signals to exploit the resonance. For example, by driving quantum well modulator 195 at approximately a resonant frequency of the quantum well modulator 195 and inductor 350 elements, it is possible to achieve a voltage doubling effect and to improve overall efficiency of drive circuit 300.

Figure 5:
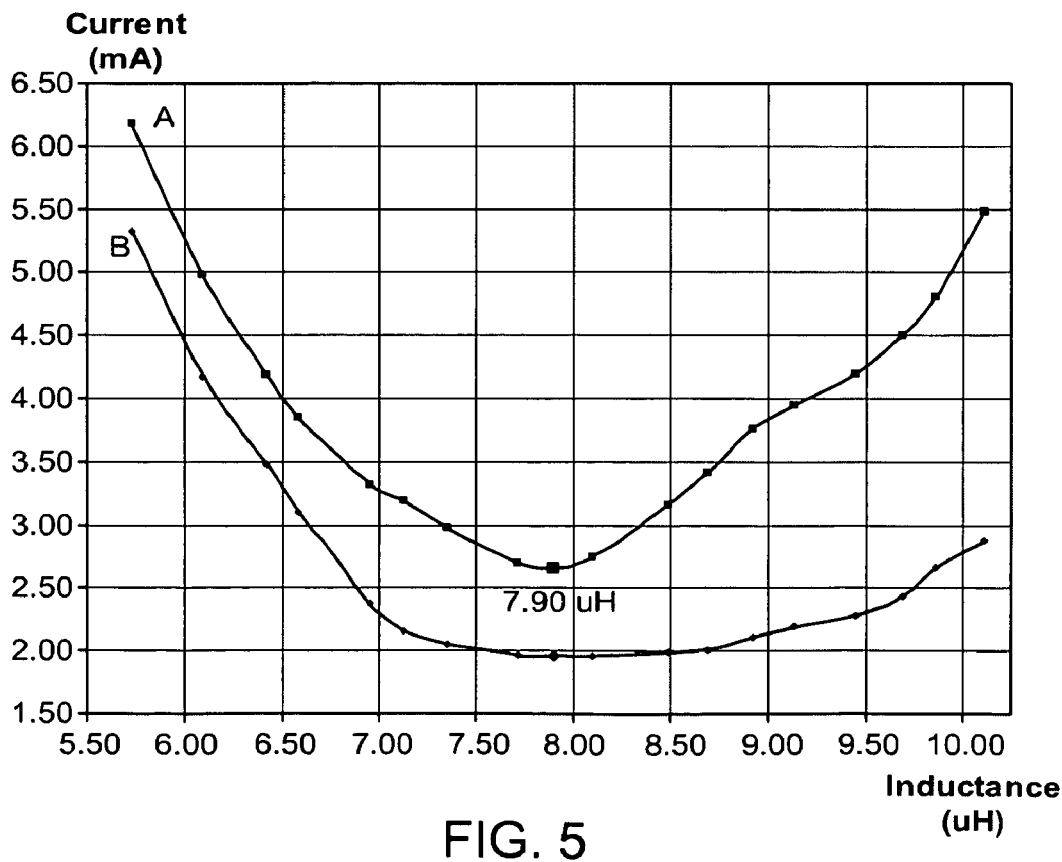
FIG. 5 is a plot showing aspects of drive circuit performance.

FIG. 5 illustrates a relationship between current flow and an inductance value of inductor 350 for an exemplary drive circuit such as drive circuit 300. Two data series A, B are depicted. Series A corresponds to a switching rate of approximately 1.5 MHz. Series B values are based on a switching rate of approximately 751 kHz. For a given switching rate, resonant characteristics of the drive circuit can be exploited by selecting a value of inductor 350 which minimizes current flow. As illustrated, an inductance of approximately 7.9 µH minimizes current flow in the exemplary drive circuit for both data series.

Figure 6:
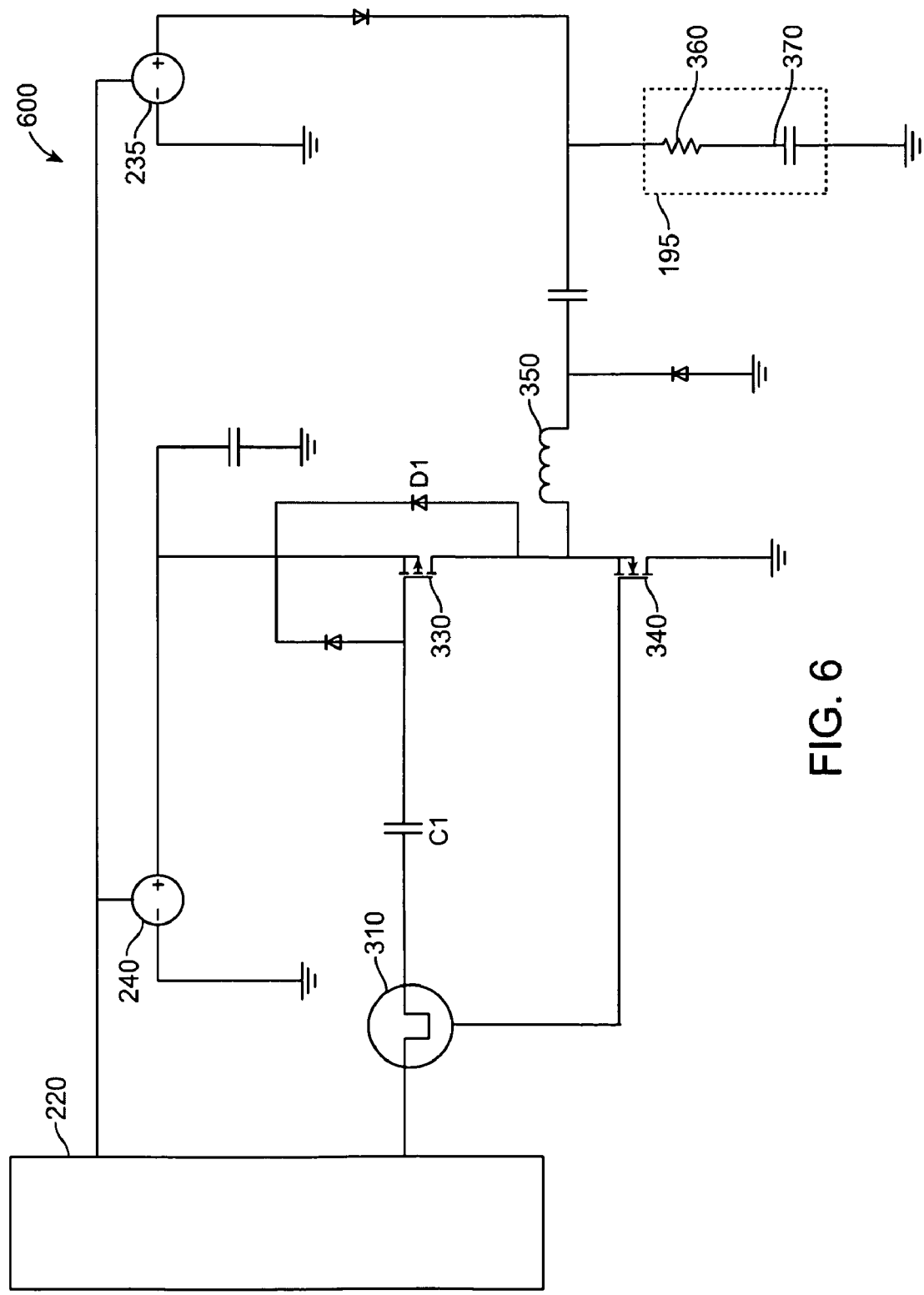
FIG. 6 is a schematic diagram of a drive circuit according to a further embodiment of the present invention.

FIG. 6 shows another embodiment of a drive circuit 600 such as can be used with QWM controller 230. Drive circuit 600 is similar to drive circuit 300 with the exception that processor 220 supplies only upper drive signal 310. Diode D1 is also added between the source and drain terminals of upper switch 330. Drive circuit 600 eliminates the transition (dead time) periods separating the modulating interval and return interval.

Figure 7:
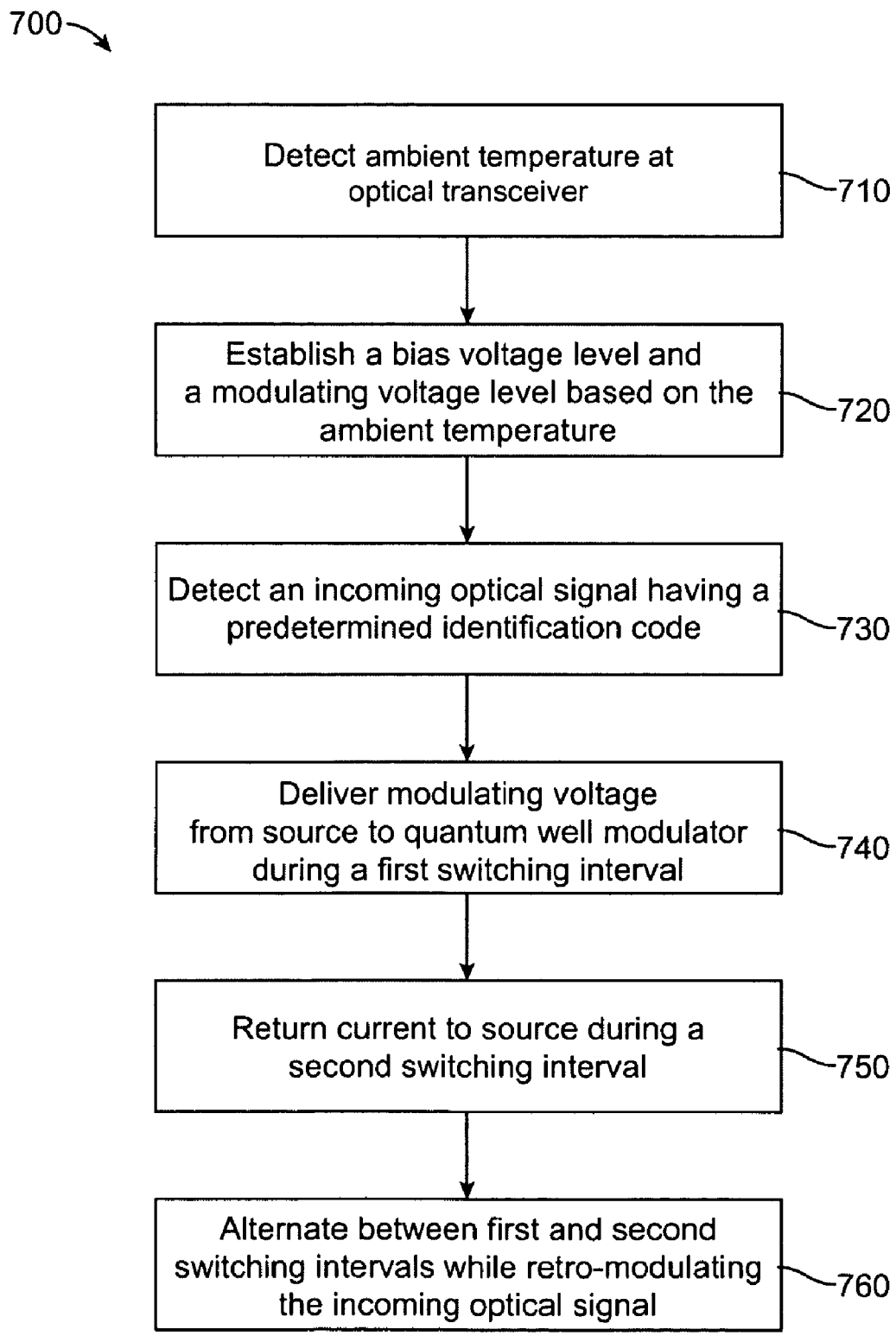
FIG. 7 is a flowchart depicting a method of controlling a quantum well modulator.

FIG. 7 illustrates a method 700 of controlling a quantum well modulator according to one embodiment of the present invention. The method 700 can be used with an optical transceiver such as optical transceiver 200 and, in particular, with a drive circuit such as drive circuits 300, 600.

At block 710, an ambient temperature of the optical transceiver is detected. Ambient temperature can be an indicator of the optical performance of a quantum well modulator. Based on the ambient temperature, at block 720 a bias voltage level and a modulating voltage level are determined. For example, predetermined values of bias voltage and modulation voltage may be retrieved from a memory of the optical transceiver or calculated to achieve an optimum modulation depth for retro-modulating an incoming optical signal.

At block 730, an incoming optical signal is detected. The incoming optical signal can include an identification code used to trigger retro-modulation by the optical transceiver. For example, the optical transceiver may be configured to recognize a challenge code as part of an optical message and to retro-modulating the incoming optical signal with an appropriate response code. The response code can be time-aligned with the optical message and retro-modulation can accomplished by selectively applying a modulating voltage to a quantum well modulator of the optical transceiver.

During a first switching interval, block 740, the modulating voltage is delivered from a power source of the optical transceiver to the quantum well modulator. The modulating voltage can change the optical properties of the quantum well modulator causing it to selectively pass or attenuate portions incoming optical signal. In some embodiments, the optical transceiver is a portable device and the power source can include one or more batteries.

The modulating voltage can cause a current to flow from the power source. For example, current may flow in a drive circuit of the optical transceiver. During a second switching interval, block 750, current associated with the modulating voltage is returned to the power source. At block 760, the optical transceiver alternates between delivering the modulating voltage to the quantum well modulator and returning current to the power source. The timing and duration of the first and second switching intervals can be determined based on electrical properties of the drive circuit and the quantum well modulator. For example, the timing of the intervals may be based on a resonance such that current flow associated with the modulating voltage is reduced.

Specific details are given in the above description to provide a thorough understanding of the embodiments. However, it is understood that the embodiments may be practiced without these specific details. For example, circuits may be shown in block diagrams to avoid unnecessary detail. In other instances, well-known circuits, processes, algorithms, structures, and techniques may be shown without unnecessary detail to avoid obscuring the embodiments.

While the principles of the disclosure have been described above in connection with the specific apparatuses and methods, it is to be clearly understood that this description is made only by way of example and not as a limitation on the scope of the disclosure.

What is claimed is:

1. A drive circuit for a quantum well modulator, comprising:
    a bias voltage source coupled to the quantum well modulator and configured to supply a bias voltage to the quantum well modulator;
    a modulation voltage source configured to supply a modulating voltage to the quantum well modulator for changing an optical property thereof;
    a first switch coupled to the modulation voltage source and to the quantum well modulator, the first switch configured to deliver the modulating voltage to the quantum well modulator via a first conduction path according to a state of the first switch;
    a second switch coupled to the first switch and to the quantum well modulator, the second switch configured to return a current associated with the modulating voltage to the modulation voltage source via a second conduction path according to a state of the second switch; and
    a processor configured to vary the state of the first switch and the second switch such that the modulation voltage source alternately supplies the modulating voltage and returns the current to the modulation voltage source.

2. The drive circuit of claim 1 wherein the modulation voltage source comprises a battery.

3. The drive circuit of claim 1 wherein the processor varies the state of the first switch and the second switch at a predetermined interval.

4. The drive circuit of claim 3, wherein the predetermined interval is based on a resonance of the drive circuit and the quantum well modulator.

5. The drive circuit of claim 1 further comprising an inductor coupled to the first and second switches and to the quantum well modulator, wherein the inductor forms part of the first conduction path and the second conduction path.

6. The drive circuit of claim 1, further comprising a temperature detector coupled to the processor and configured to detect an ambient temperature of the drive circuit.

7. The drive circuit of claim 6, wherein the processor is configured to separately adjust a level of the modulating voltage and the bias voltage based on an input from the temperature detector.

8. The drive circuit of claim 7, further comprising a memory coupled to the processor, wherein the processor is configured to retrieve the voltage levels from the memory.

9. The drive circuit of claim 8, wherein the memory comprises a lookup table including modulation voltage levels, bias voltage levels, and ambient temperature values associated with the modulation voltage and bias voltage levels.

10. The drive circuit of claim 7, wherein the processor determines the voltage levels according to an optical response characteristic of the quantum well modulator.

11. An communication device, comprising:
    a modulator comprising:
        a quantum well modulator configured to modulate an incoming optical signal in response to a modulation voltage,
        a first conduction path comprising a first switch for selectively delivering a modulating voltage from a power supply to the quantum well modulator based on a first control signal, and
        a second conduction path comprising a second switch for selectively returning a current associated with the modulating voltage to the power supply based on a second control signal;
    a retro reflector coupled to the quantum well modulator and configured to reflect the modulated optical signal away from the communication device; and
    a processor configured to generate a timing of the first and second control signals such that pulses of the modulation voltage are delivered to the quantum well modulator during a first interval and current is returned to the power supply during a second interval.

12. The communication device of claim 11, further comprising:
    an optical receiver coupled to the processor and configured to receive the incoming optical signal, wherein the processor is configured to time-align the control signals with the incoming optical signal.

13. The communication device of claim 11, further comprising a temperature detector coupled to the processor and configured to detect an ambient temperature of the communication device.

14. The communication device of claim 13 wherein the processor is configured to change an amplitude of the modulation voltage based on the ambient temperature of the communication device.

15. The communication device of claim 13 wherein the processor is further configured to adjust a bias voltage of the quantum well modulator independently of the modulation voltage.

16. The communication device of claim 15 wherein the processor adjusts the bias voltage and the modulation voltage based on the ambient temperature of the communication device.

17. The communication device of claim 15 wherein the power supply comprises a battery.

18. A drive circuit, comprising:
    a first voltage source coupled to a quantum well modulator for establishing a bias level of the quantum well modulator;

a second voltage source configured to deliver a modulating voltage to the quantum well modulator for changing an optical property of the quantum well modulator when the quantum well modulator is biased by the first voltage source;

a temperature detector configured to detect an ambient temperature of the drive circuit; and a processor coupled to the temperature detector and configured to control delivery of the modulating voltage in response to an incoming optical signal and to dynamically adjust a voltage level of the first voltage source and the second voltage source based on the ambient temperature; and a first switch coupled to the second voltage source and the quantum well modulator for delivering the modulating voltage to the quantum well modulator in response to a first control signal; and a second switch coupled to the quantum well modulator and to a ground potential for returning a current associated with the modulating voltage to the second voltage source in response to a second control signal, wherein the processor is configured to determine a timing of the first and second control signals.

19. The drive circuit of claim 18, further comprising an inductor coupled to the quantum well modulator and to the first and second switches, wherein the processor controls the timing of the first control signal and the second control signal according to a resonant frequency of the inductor and the quantum well modulator.

20. The drive circuit of claim 18, wherein the processor controls the modulation voltage by making and interrupting a connection between the second voltage source and the quantum well modulator.

21. A method of controlling a quantum well modulator with a drive circuit, comprising:

detecting an ambient temperature of the quantum well modulator;

determining a bias voltage level based on the ambient temperature;

determining a modulating voltage level based on the ambient temperature;

delivering the bias voltage to the quantum well modulator;

delivering pulses of the modulating voltage to the quantum well modulator in response to an incoming optical signal; and generating a first control signal and a second control signal such that the pulses of the modulation voltage are delivered to the quantum well modulator during a first interval via a first conduction path comprising a first switch and current is returned to the power supply during a second interval via a second conduction path comprising a second switch so as to minimize a power consumption of the drive circuit.

22. The method of claim 21, further comprising:
transmitting the incoming optical signal to a retro-reflector in response to a first level of the modulation voltage; and
attenuating the incoming optical signal in response to a second level of the modulation voltage.

23. The method of claim 21, further comprising aligning the pulses of the modulating voltage in time with pulses of the incoming optical signal.

24. The method of claim 21, further comprising modulating the incoming optical signal with a predetermined code sequence.

* * * * *